June 14, 1932.  J. CRISANTI  1,863,473
AUXILIARY VEHICLE WHEEL
Filed Oct. 6, 1931   2 Sheets-Sheet 1
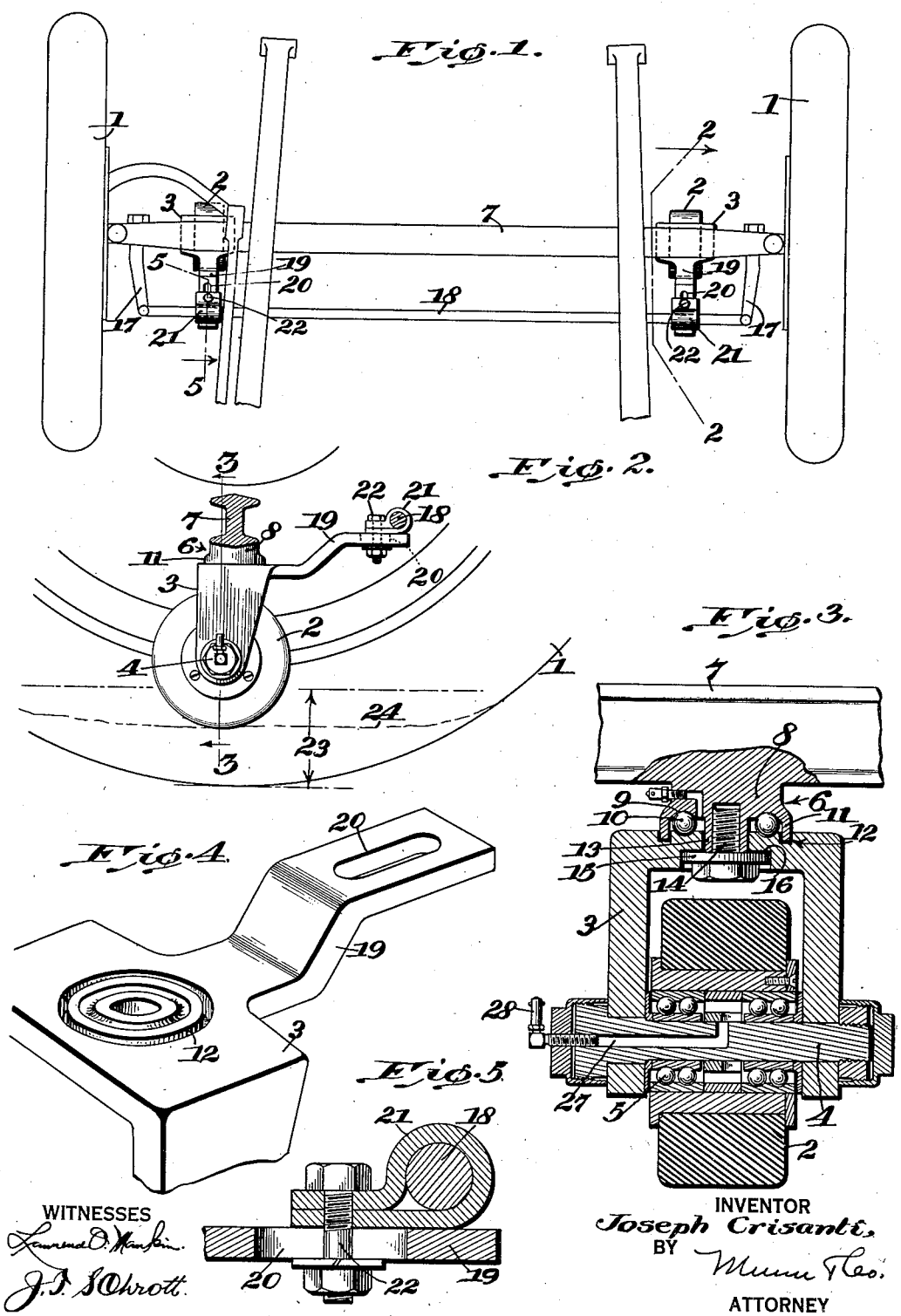
WITNESSES
INVENTOR
Joseph Crisanti,
BY
ATTORNEY June 14, 1932. J. CRISANTI 1,863,473
AUXILIARY VEHICLE WHEEL
Filed Oct. 6, 1931 2 Sheets-Sheet 2
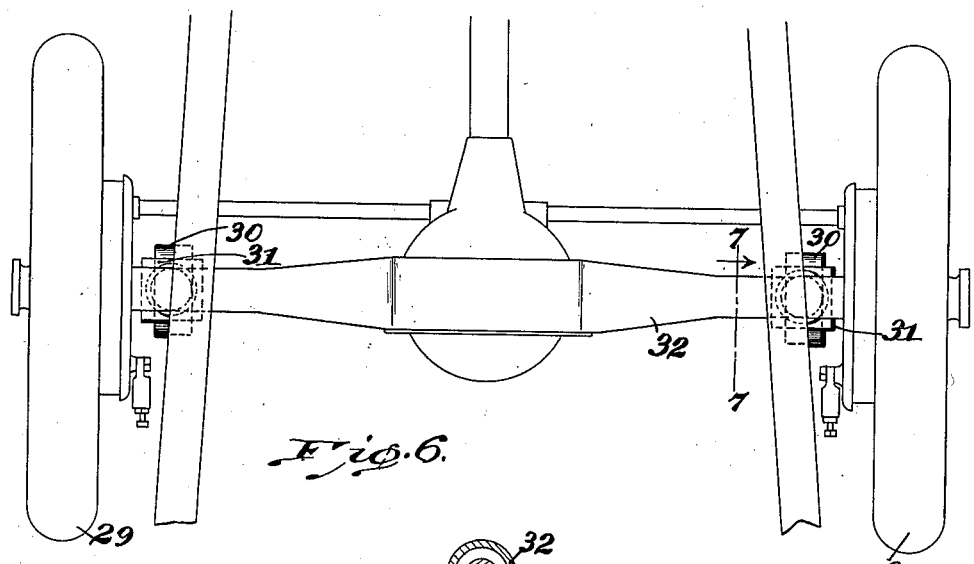
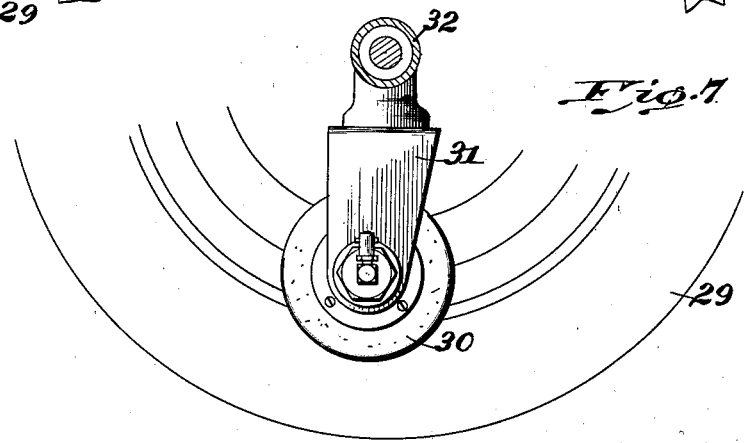
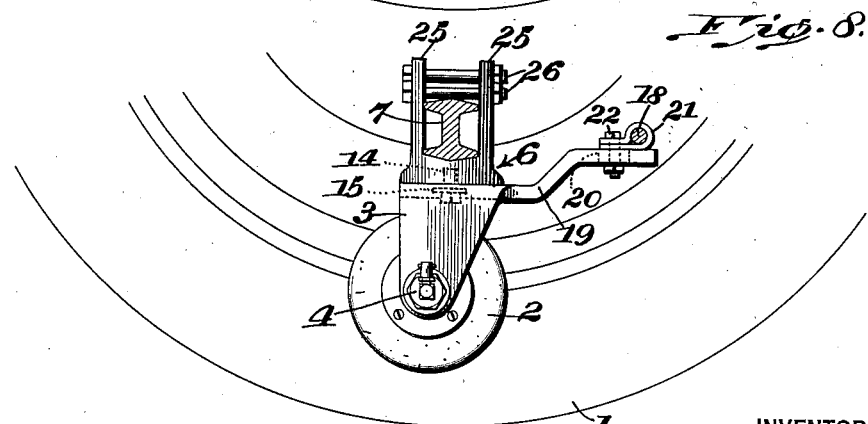
WITNESSES
INVENTOR
Joseph Crisanti,
BY
ATTORNEY Patented June 14, 1932

1,863,473

UNITED STATES PATENT OFFICE

JOSEPH CRISANTI, OF MANASQUAN, NEW JERSEY

AUXILIARY VEHICLE WHEEL

Application filed October 6, 1931. Serial No. 567,268.

This invention relates to improvements in vehicles, more particularly in the steering assemblages of vehicles, and the objects of the improvement are as follows:—

First, to provide the front of a vehicle with a permanently attached set of steerable auxiliary wheels, the turning means of each auxiliary wheel including an arm which has a pivotal connection with a clamp fixed on the tie bar, said arm having a slot which not only completes the pivotal connection but compensates for such variations in the distance of the tie bar from the axle as may occur in different makes of vehicles.

Second, to provide a simple yet very effective bearing means for the mount by which the auxiliary wheel is carried, said bearing means including a circular flange which projects from a boss on the axle in such a way as to form a seal for the exclusion of foreign matter, as hereinafter set forth.

Third, to provide auxiliary wheels having the foregoing characteristics, said wheels being so located in reference to the front wheels of the vehicle that the bottoms of the auxiliary wheel peripheries will be within what might be called the "flat zone" of the tires, so that when a front tire goes flat the periphery of the adjacent wheel will immediately ride the road and support the superimposed weight of the vehicle in substitution for the flat tire.

Other objects and advantages will appear in the following specification, reference being had to the accompanying drawings in which Figure 1 is a plan view of enough of the front end of a vehicle to illustrate the auxiliary wheels which comprise important parts of an improved steering assemblage, Figure 2 is a cross section taken on the line 2—2 of Figure 1, Figure 3 is a detail vertical section taken on the line 3—3 of Figure 2, particularly illustrating the auxiliary wheel mount and its swivel support on the front axle, Figure 4 is a fractional perspective view of the wheel mount, particularly illustrating the turning arm, Figure 5 is a detail section taken on the line 5—5 of Figure 1, Figure 6 is a plan view of the rear end of the chassis, illustrating the application of auxiliary wheels to the rear axle, Figure 7 is a cross section taken on the line 7—7 of Figure 6, Figure 8 is a view similar to Figure 2 but specifically illustrating a removable type of support.

The outstanding purpose of the invention, as expressed in some detail in the foregoing statements of the specific objects, is to prevent damage to the vehicle and possible loss of life of the occupant upon the occasion of one of the tires becoming punctured or blown out while the vehicle is being driven at high or even moderate speeds. To this end the regular pneumatic tired front wheels 1 (the immediate description being devoted to the front end of the vehicle) are supplemented by a pair of auxiliary wheels 2 (Figs. 1 and 2) which also have rubber tires (Fig. 3), but not necessarily of the pneumatic type.

Each of the auxiliary wheels 2 is revolubly carried by a mount 3 (Figs. 2 and 3) which generally comprises a yoke by which a spindle 4 is carried (Fig. 3) for the purpose of supporting the ball bearings 5 of the respective auxiliary wheel. The mount 3 is in each instance connected with a swivel support 6 (Fig. 3) attached to the front axle 7.

The attachment of the swivel support 6 is preferably permanent (Fig. 3), but in some instances it is desirable to make the connection temporary (Fig. 8), that is to say, of such a nature that it is more readily removed from the front axle than is the so-called permanent support. One mode of making the permanent swivel support is to provide the axle with an integral boss 8 which is made with a ball race 9 against which a set of balls 10 bears. The boss 8 has a circular flange 11 extending sufficiently far beyond the balls 10 to provide an adjacent seal when the rim of the flange is seated in an annular groove 12 in the top of the mount 3.

In the middle of the boss 8 there is a stub shaft 13 (Fig. 3) which is long enough to extend part way through the top of the mount 3. This shaft is bored and tapped to receive a screw stud 14, the arrangement being such that when the screw stud is screwed home, the rather large washer-like addition 15 to its head will not only bind against the end of the stub shaft 13 but will provide a rather broad bearing for the mount 3 where it rests in a circular recess 16 in the top. Thus far it will be understood that the mount 3 is free to turn on its swivel support 6, the plane of turning being horizontal as in the instance of each of the front wheels 1.

These front wheels are revolubly mounted on steering knuckles 17 (Fig. 1) according to known practice. The steering knuckles are connected by a tie rod 18 which shifts back and forth when the conventional steering mechanism (not shown) is operated. This shifting of the tie rod accomplishes the steering movements of the front wheels 1, and these steering movements are faithfully reproduced or duplicated by each of the auxiliary wheels 2 by a coupling of the mounts 3 with the tie rod 18.

Each coupling comprises a turning arm 19 (Figs. 2 and 4) which is fixed to the yoke 3 at one end, and at its free end has a slot 20 at which a loose connection is made at the tie rod. For this purpose the tie rod carries an appropriate clamp 21 which must be fixed. A stud 22 (Fig. 5) joins the clamp 21 with the arm 19 and makes the actual connection between the arm and the tie rod. It must be understood that the connection between the arm and the tie rod will be subject to any preferred mechanical variation. The arrangement in Figure 5 is merely illustrative, and it is regarded within the purview of the invention to substitute any equivalent which will convert back and forth movements of the tie rod into swinging movements of the arm 19 so that the steering movements of the front wheels 1 are repeated in the auxiliary wheels 2 as already brought out.

It will be observed in Figure 5 that the fixed clamp 21 includes a projecting portion by which the foregoing stud 22 is carried. This stud occupies the slot 20, and in addition to the slot completing the pivotal connection between the arm 19 and the clamp 21, said slot also compensates for any slight differences or variations in the distance of the tie bar 18 from the axle 7 in various makes of vehicles to which the invention may be applied.

In applying the auxiliary wheels 2 to the axle 7 an important consideration must be borne in mind. Each wheel will be mounted near the rod. The wheel 2 (Fig. 2) will appreciably overlap the pneumatic tire of the wheel 1 or, in other words, extend well down beside the tire of the wheel 1 so as to be near the road. The purpose of this arrangement is to bring the bottom periphery of the wheel 2 (Fig. 2) within what is herein called the "flat zone" 23 of the pneumatic tire.

The meaning of the "flat zone" is this:—In the event of deflation of the pneumatic tire of the wheel 1 the vehicle will naturally settle on that side until the rim rides the road with only the tire parts interposed. It is intended that the vehicle shall not be permitted to settle that far because the riding of the rim under the condition named is not only likely to totally destroy the inner tube but to seriously damage the tire shoe itself, not to speak of the severe unbalancing of the vehicle and the likelihood of an accident.

Suppose a pneumatic tire goes flat as indicated at 24 in Figure 2. By virtue of the fact that the bottom periphery of the adjacent auxiliary wheel 2 comes well within the so-called "flat zone" 23, the auxiliary wheel will immediately ride the road and take the load in substitution of the deflated tire. The amount of drop of the auxiliary wheel 2 to the road is so little that the fact of the flat tire will scarcely be noticed by the driver. In an actual test wherein an automobile was driven at the rate of sixty miles an hour and an arrangement made whereby the tire of one of the front wheels could be cut by a contrivance within the automobile it was found that the auxiliary wheel functioned perfectly, dropping to the road and taking the load without unbalancing the vehicle in the least.

At this point it is important to emphasize the steerability of the auxiliary wheels 2. These are tied permanently, so to speak, to the tie rod 18. In the event of a tire deflation it is absolutely essential not to suspend the steering function because the ability to continue steering the vehicle would be imperative in an instance where one of the front tires goes flat while the vehicle is rounding a curve. The coupling means 19 between the tie rod 18 and the respective mount 3 provides for a continuity of the control of the steering assemblage regardless of whether one or both of the tires of the front wheels 1 go flat or not.

The foregoing description is predicated on a permanent attachment of the swivel support 6 (Fig. 3) to the front axle 7. The mount 3 is of course capable of being disassembled but not without first removing the auxiliary wheel 2. Figure 8 illustrates an arrangement by which the mount 3 is readily removed from the front axle 7 without having to disassemble anything else. The swivel support, again denoted 6, instead of including an integral boss such as 8 in Figure 3, now has a pair of upstanding ears 25 which are long enough to extend past the axle. Bolts 26 are applied in the manner shown to secure the ears, but when these are removed the support is readily lifted off. In its other respects the auxiliary wheel and its appurtenances are identical with the structure shown in Figure 3.

This figure (Fig. 3) is briefly reverted to for a description of the structural details. The spindle 4 has a bore 27 which will be supplied with grease through a nipple 28. This grease will be conducted to the interior of the hub of the auxiliary wheel so as to keep the ball bearings 5 lubricated. On a similar principle the ball bearings 10 are lubricated. In addition to the circular flange 11 providing a dirt seal it also provides a grease seal. The dirt will be prevented from working in and the grease from working out.

It is a matter of no little importance that the stub shaft 13 has communication with the space inside of the ball series 10. When this space is filled with grease some of it will naturally work down beside the stub shaft 13 and ultimately reach the circular recess 16 which provides part of the bearing of the mount 3.

It is regarded as of equal importance to guard against a deflation of the tires of the rear wheels 29 (Figs. 6 and 7). Here there is no necessity for turning the pair of auxiliary wheels 30 of which there is one beside each main wheel 29. The bottom peripheries of the auxiliary wheels extend within the "flat zone" of the rear wheels as in the instance already described. The mounts 31 of the rear auxiliary wheel 30 are intended to be secured to the rear axle 32 in any preferred manner. The mounts 31 are not intended to turn as are the mounts 3 in the front steering assemblage. Otherwise the bearing structure of the auxiliary wheels 30 is identical with that of the front auxiliary wheels, and the showing in Figure 3 might be regarded as of a vertical section of Figure 7.

The operation is readily understood. Consider the steering assemblage at the front of the vehicle first. The swivel support 6 (Fig. 3) of each auxiliary wheel 2 (Fig. 1) includes a boss 8 made integral with the front axle 7. When the respective mount 3 is once attached it is intended to stay attached. The arms 19 of the mounts 3 extend backward where they are provided with a loose connection with the tie rod 18.

This loose connection obtains only insofar as the arm 19 and clamp 21 are concerned. The clamp itself is intended to be fixed to the tie rod. The obvious purpose of the slot 20 is to compensate for the arcuate movement of the arm 19 when the tie rod is shifted back and forth.

The steering assemblage thus comprises duplicate ground wheels 1, 2. The pair 2 is normally elevated from the ground although the bottom peripheries are close to the ground, being well within the "flat zone" 23 (Fig. 2) as already pointed out. The other pair 1 is in normal contact with the ground, but should one of these wheels become disabled, that is to say, become deflated, broken, or fly off, the companion auxiliary wheel 2 would immediately drop to the road and take its place where it would not only support its part of the load but would instantly carry on the steering function without the operator so much as noticing the change.

In the instance of the rear auxiliary wheels 30 (Fig. 6) the steering function is of course absent. But should one of the wheels 29 become disabled, the companion auxiliary wheel 30 would immediately substitute for it as already brought out.

While on the subject of the rear wheels, the auxiliary wheels 30 serve another important purpose. In some instances trucks are provided with double rear wheels on each side and in cases where the extra wheel is attached as a precaution against one of the tires going flat, the auxiliary wheels 30 can be substituted and so save the cost of a pair of extra wheels.

I claim:—

1. In a steering assemblage, a regular wheel revolubly mounted on a steering knuckle turnably carried by an axle, an auxiliary wheel, a mount revolubly carrying the auxiliary wheel, said mount having a bore with a circular recess and having an annular groove, a boss carried by the axle, bearings between the mount and the boss, a circular flange projecting from the boss into the groove to provide a seal, a stub shaft centered on the boss and projecting into the bore substantially flush with the bottom of the recess, a screw stud applied to the stub shaft and having a washer-like addition confronting the recess to turnably attach the mount to the boss, and means to impart consonant steering motions to the steering knuckle and said mount.

2. In a vehicle having a pair of front wheels, a tie bar connecting the steering knuckles of said wheels, and an axle by which said knuckles are turnably carried; a clamp fixed on the tie bar near each knuckle so as to be adjacent to the respective wheel, each clamp including a projecting portion, a stud carried by each projecting portion and constituting part of a pivotal connection, an auxiliary wheel for each front wheel, each auxiliary wheel having a mount, bearing means by which the mounts are connected with the axle for turning, and an arm extending from each mount for connection with the respective stud, each arm having a slot receiving the respective stud to complete the pivotal connection and to compensate for variations in the distance of the tie bar from the axle.

JOSEPH CRISANTI.